United States Patent
Bisa et al.

(10) Patent No.: US 10,853,204 B2
(45) Date of Patent: Dec. 1, 2020

(54) SYSTEM AND METHOD TO DETECT AND RECOVER FROM INOPERABLE DEVICE MANAGEMENT BUS

(71) Applicant: Dell Products, L.P., Round Rock, TX (US)

(72) Inventors: Rama Rao Bisa, Bangalore (IN); Chitrak Gupta, Bangalore (IN); Mohan Murali Gurram, Bangalore (IN); Komal Dhote, Chhattisgarh (IN); Suresh Vijaykumar, Chennai (IN); Prasanna Kumar Sahoo, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 168 days.

(21) Appl. No.: 16/171,528

(22) Filed: Oct. 26, 2018

(65) Prior Publication Data

US 2020/0133805 A1 Apr. 30, 2020

(51) Int. Cl.
  *G06F 11/00* (2006.01)
  *G06F 11/20* (2006.01)
  *G06F 13/16* (2006.01)
  *G06F 13/42* (2006.01)

(52) U.S. Cl.
  CPC ...... *G06F 11/2012* (2013.01); *G06F 13/1668* (2013.01); *G06F 13/4282* (2013.01); *G06F 2201/805* (2013.01); *G06F 2213/0016* (2013.01)

(58) Field of Classification Search
  CPC ................................................. G06F 11/2012
  See application file for complete search history.

(56) References Cited

U.S. PATENT DOCUMENTS

2017/0192917 A1* 7/2017 Yates .................. G06F 13/1652
2018/0136706 A1* 5/2018 Wiencke ............... G06F 1/3206

* cited by examiner

Primary Examiner — Katherine Lin
(74) Attorney, Agent, or Firm — Fogarty LLP (57) ABSTRACT

Embodiments are described for detecting and recovering from an inoperable device management bus. A remote management controller is configured to offload device management bus transactions that use a messaging protocol. The messing protocol transactions are offloaded to a bus protocol controller that is responsible for managing bus operations using the messaging protocol. The bus protocol controller updates a set of bus status counters stored in a shared memory based on the processing of the offloaded messaging protocol transactions. The remote management controller processes device management bus transactions that use a bus protocol and updates the bus status counters based on the status of the bus protocol transactions. The remote management controller determines the status of the device management bus based on the bus status counters in shared memory, if the device management bus is inoperable, resets the remote management controller.

19 Claims, 4 Drawing Sheets

SYSTEM AND METHOD TO DETECT AND RECOVER FROM INOPERABLE DEVICE MANAGEMENT BUS

FIELD

The present disclosure generally relates to Information Handling Systems (IHSs), and, more particularly, to bus communications between components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS includes buses that are used to communicate signals, such as transmitting data, between the various components that comprise an IHS. Such buses are prone to becoming frozen in an inoperable state due to various types of malfunctions, errors and spurious conditions. Buses may also become inoperable due to an inability to process received bus messages quickly enough to prevent overflow of buffers to which the bus messages are stored upon receipt. When buses used for monitoring and management functions become inoperable, messages transmitted in support of these functions may be dropped and the effectiveness of the monitoring and management functions may be compromised.

In scenarios where a bus becomes inoperable, bus communications may be resumed by restarting the components. However, restarting these components may render them inoperable and may require restarting the IHS. In certain scenarios, such restart requirements may be infeasible. For instance, sideband (i.e., out-of-band) management buses used for monitoring a component may become inoperable. However, restarting the monitored component in order to restart such a sideband bus is greatly disfavored in scenarios where such restarts result in downtime of services supported by the component, and potentially the IHS.

SUMMARY

A method is provided for detecting and recovering from an inoperable device management bus by a remote management controller. The method includes: offloading bus transactions using a first protocol to a bus controller managing device management bus operations using the first protocol; updating, by the bus controller, bus status counters based on a monitored status of the offloaded first protocol bus transactions; processing device management bus transactions using a second protocol; updating the bus status counters based on the status of the second protocol bus transactions; determining the status of the bus based on the bus status counters in shared memory; and if the bus is inoperable, resetting the remote management controller.

In additional method embodiments, the device management bus comprises an I2C bus. In additional method embodiments, the bus protocol controller comprises an I2C co-processor of the remote management controller. In additional method embodiments, the first protocol comprises MCTP (Management Component Transport Protocol) messaging. In additional method embodiments, the second protocol comprises IPMB (Intelligent Platform Management Bus) bus transactions. In additional method embodiments, the status of the device management bus is determined based on the bus status counters indicating consecutive errors in the first protocol bus transactions or the second protocol bus transaction. In additional method embodiments, the status of the device management bus is determined based on the bus status counters indicating stalled progress in the first protocol bus transactions or the second protocol bus transaction.

In various additional embodiments, a system manages a device management bus coupled to a plurality of managed devices. The system includes: a shared memory storing bus status counters; a remote access controller coupled to the plurality of managed devices via the device management bus, the remote access controller configured to: offload bus transactions that utilize a first protocol to a bus protocol controller; process device management bus transactions that utilize a second protocol; update the bus status counters based on a monitored status of the second protocol transactions; and determine the status of the device management bus based on the bus status counters in shared memory; and the bus protocol controller configured for managing bus operations using the second protocol, the bus protocol controller further configured to: process the offloaded transactions using the second protocol; update bus status counters based on the status of the offloaded second protocol transactions.

In additional system embodiments, the bus protocol controller comprises an I2C co-processor of the remote management controller. In additional system embodiments, the first protocol comprises MCTP (Management Component Transport Protocol) messaging. In additional system embodiments, the second protocol comprises IPMB (Intelligent Platform Management Bus) bus transactions. In additional system embodiments, the messaging protocol comprises MCTP (Management Component Transport Protocol) messaging. In additional system embodiments, the status of the device management bus is determined based on the bus status counters indicating consecutive errors in the first protocol bus transactions or the second protocol bus transaction. In additional system embodiments, the status of the device management bus is determined based on the bus status counters indicating stalled progress in the first protocol bus transactions or the second protocol bus transaction.

In various additional embodiments, a remote management controller is provided for detecting and recovering from an inoperable device management bus, the remote management controller configured to: offload device management bus transactions using a first protocol to a bus protocol controller managing bus operations using the first protocol; update bus status counters stored in a shared memory based on the status of the offloaded first protocol transactions; process device management bus transactions using a second protocol; updating the bus status counters based on the status of the second protocol transactions; determine the status of the device management bus based on the bus status counters in shared memory; and if the device management bus is inoperable, reset the remote management controller.

In additional remote management controller embodiments, the bus protocol controller comprises an I2C coprocessor of the remote management controller. In additional remote management controller embodiments, the first protocol comprises MCTP (Management Component Transport Protocol) messaging. In additional remote management controller embodiments, the second protocol comprises IPMB (Intelligent Platform Management Bus) bus transactions. In additional remote management controller embodiments, the status of the device management bus is determined based on the bus status counters indicating consecutive error conditions in the first protocol bus transactions or the second protocol bus transaction. In additional remote management controller embodiments, the status of the device management bus is determined based on the bus status counters indicating stalled progress in the first protocol bus transactions or the second protocol bus transaction.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Remote management of IHSs supports the centralized administration of virtualized systems that are configured from these remotely managed IHSs. Remote management of an IHS may be implemented using components such as the remote access controller described herein that monitors various aspects of the operation of the IHS. Such monitoring may be implemented using sideband bus communications between the remote access controller and components of the IHS being managed by the remote access controller. Periods of interoperability of such sideband buses may prevent effective management of the IHS by the remote access controller. Embodiments described herein avoid periods of prolonged inoperability of such sideband buses and provide techniques for recovering the sideband bus without resetting the managed components or the IHS.

Figure 1:
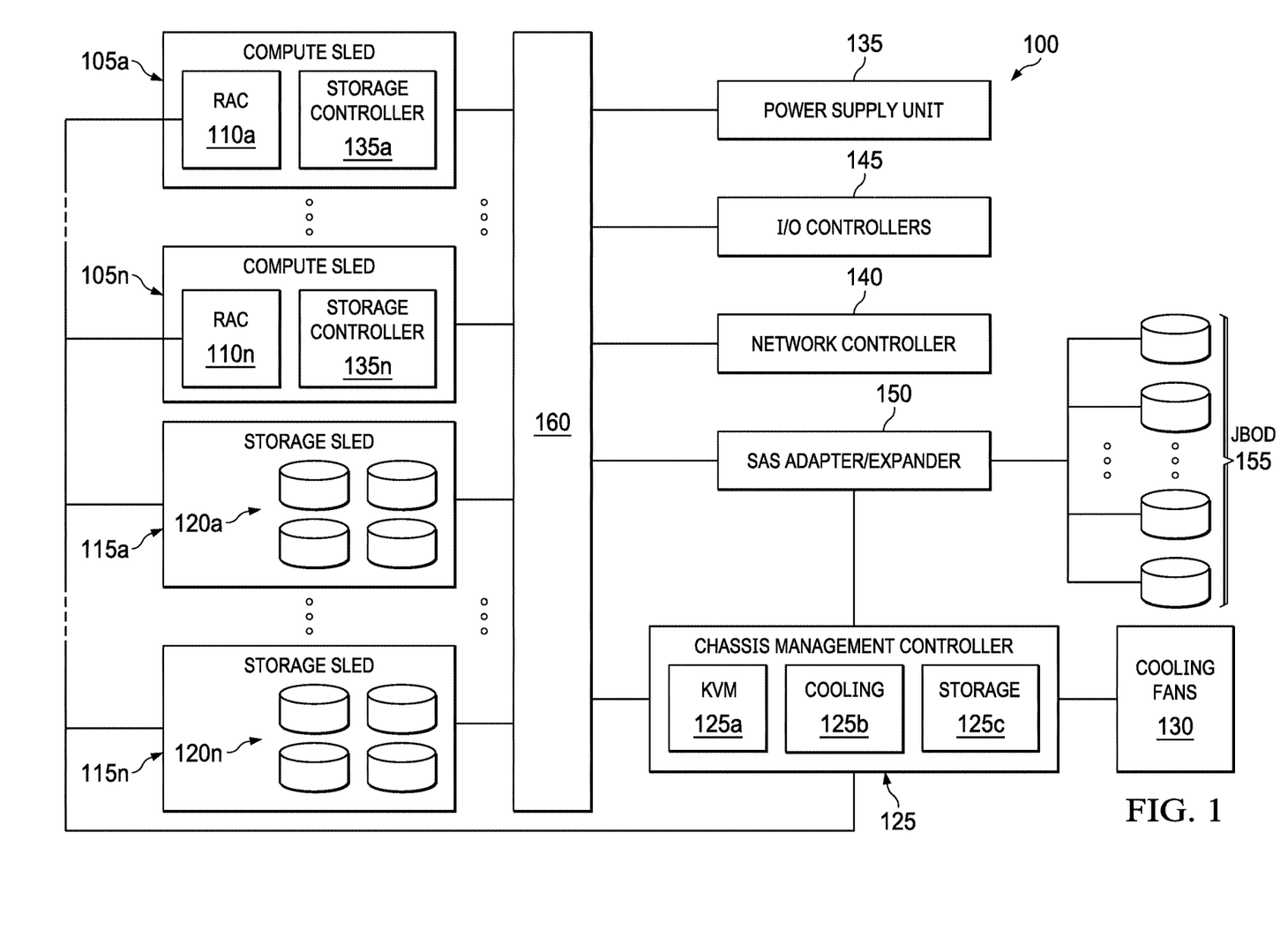
FIG. 1 is a diagram illustrating certain components of a chassis, according to some embodiments, including IHSs configured to detect and recover from an inoperable device management bus.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a- and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
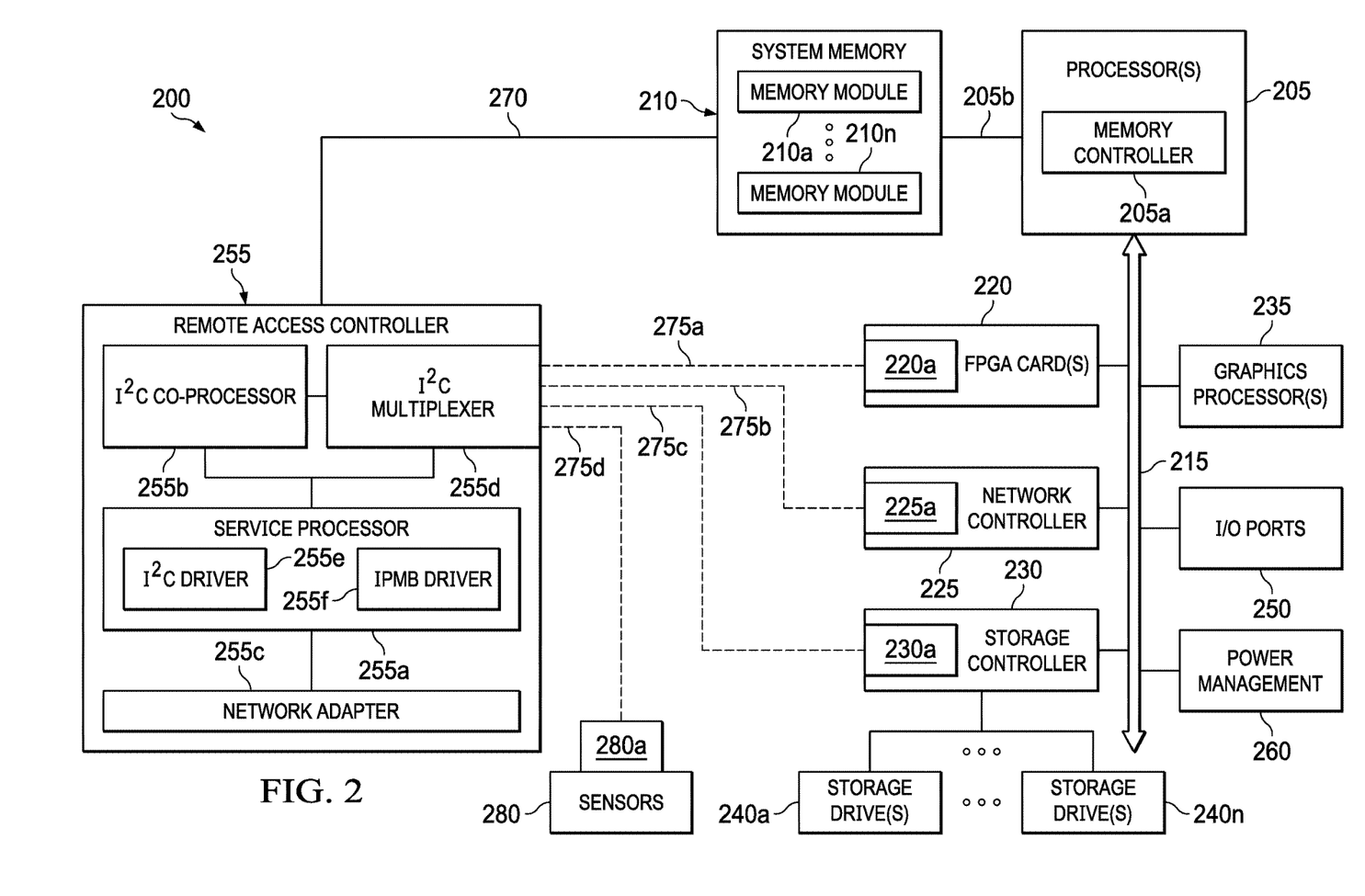
FIG. 2 is a diagram illustrating certain components of an IHS configured as a component of chassis, according to some embodiments, for detecting and recovering from an inoperable device management bus.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications with various components of a compute sled 105*a-n* and chassis 100. Remote access controller 110*a-n* may collect sensor data, such as temperature sensor readings, from components of the chassis 100 in support of airflow cooling of the chassis 100 and the sleds 105*a-n*, 115*a-n*. In addition, each remote access controller 110*a-n* may implement various monitoring and administrative functions related to compute sleds 105*a-n* that require sideband bus connections with various internal components of the respective compute sleds 105*a-n*. As described in additional detail with regard to FIGS. 3-4, management functions of the remote access controllers 110*a-n* may be compromised based on failures of such sideband bus connections.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100.

Each of the compute sleds 105*a-n* includes a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement certain sideband I2C communications between the remote access controller 255 and managed components 220, 225, 230, 280 of the IHS. The I2C co-processor 255b may be a specialized co-processor or micro-controller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a that may each be designated as field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280.

The service processor 255a relies on the I2C coprocessor 255b for processing and management of certain I2C transactions. For instance, the service processor 255a may rely on an I2C driver 255e for offloading functions that utilize MCTP (Management Component Transport Protocol) device management messages to the I2C coprocessor 255b for generating and managing the MCTP messages that comprise the offloaded function. However, for certain device management transactions, a service processor 255a may be configured to interface directly with the I2C multiplexer 255d in processing these transactions. For instance, the service processor 255a may process certain IPMI (Intelligent Platform Management Interface) transactions using an IPMB (Intelligent Platform Management Bus) driver 255f for management and processing of IPMI messages that are transmitted to managed devices via the I2C buses 275a-d.

Figure 3:
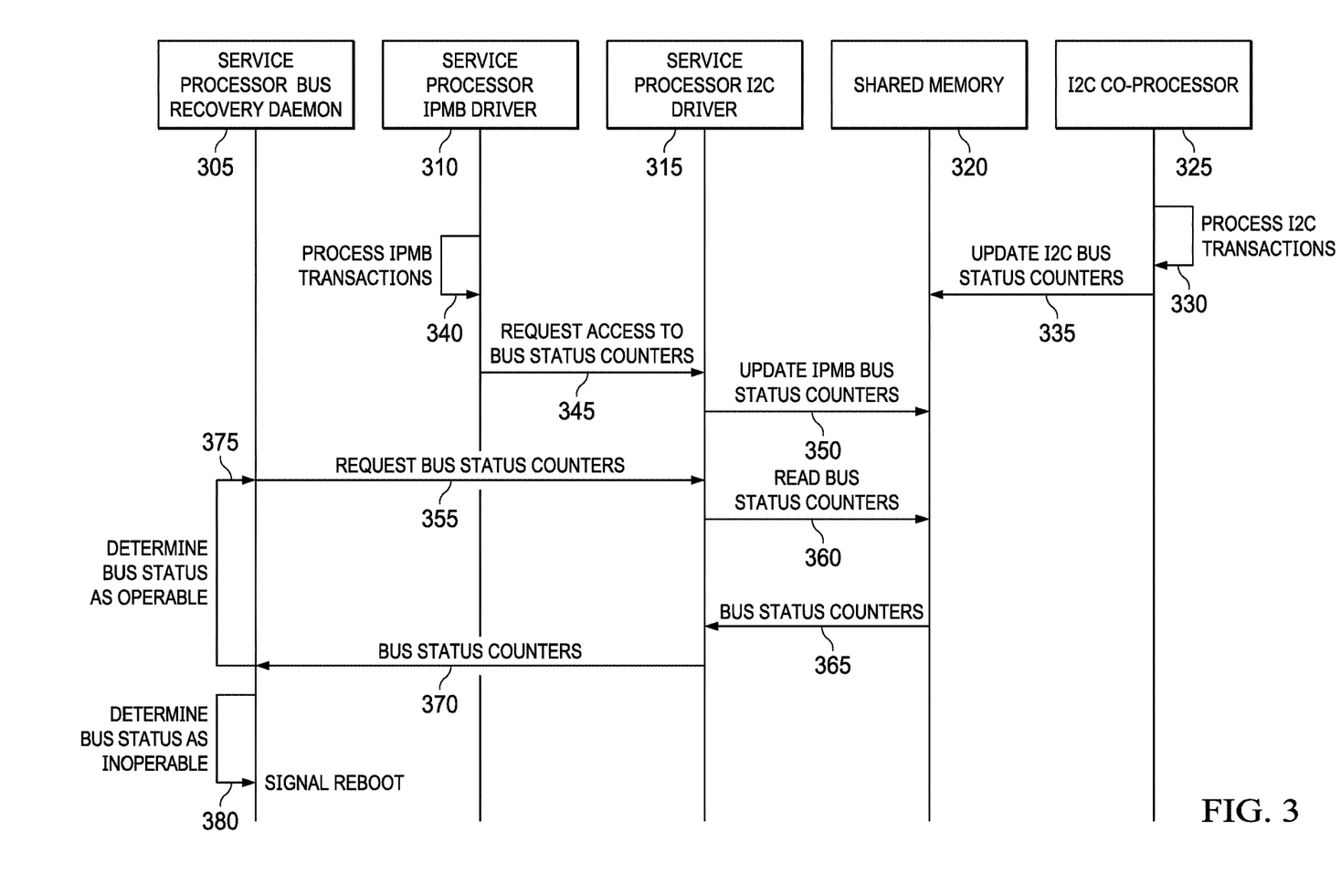
FIG. 3 is a swim-lane diagram describing certain functional responsibilities of components implementing a method, according to some embodiments, for detecting and recovering from an inoperable device management bus.
Figure 4:
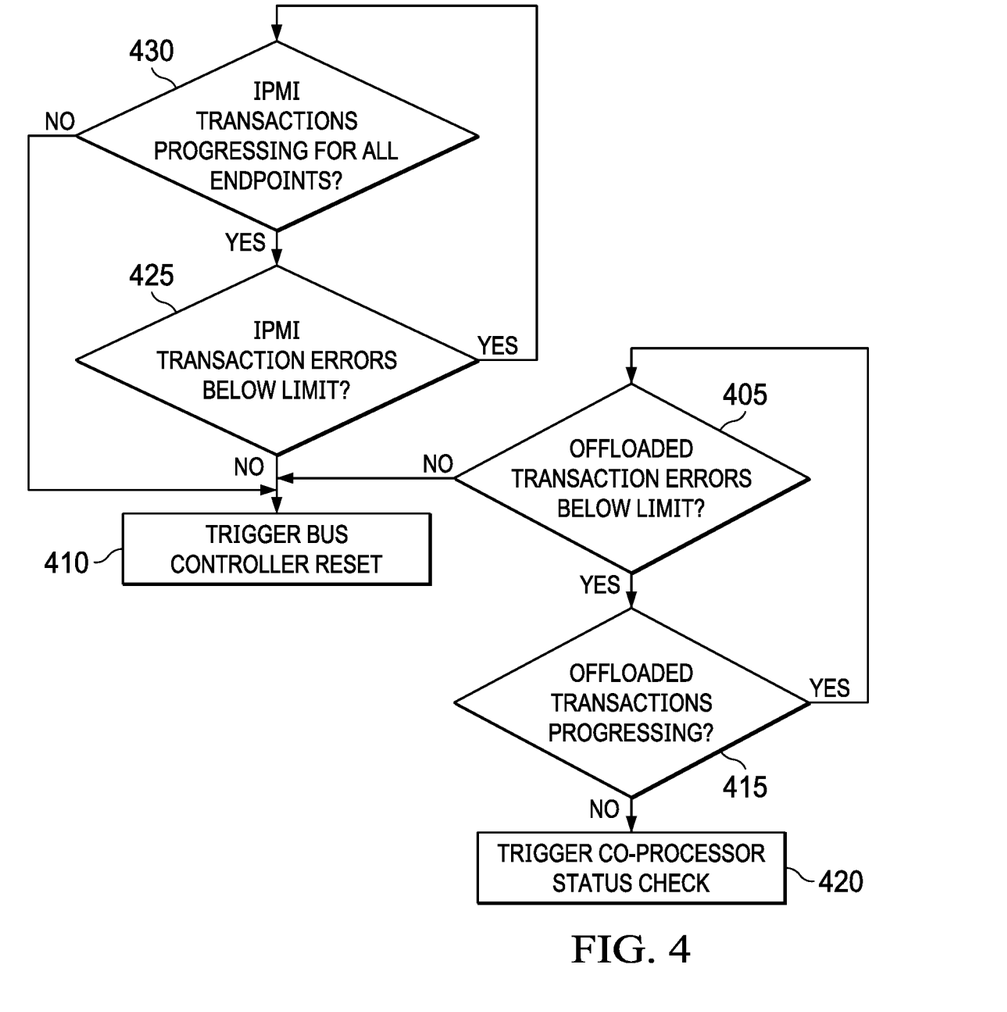
FIG. 4 is a flowchart describing certain steps of a method, according to some embodiments, for tracking bus transactions used to detect and recover from an inoperable device management bus.

As described in additional detail with regard to FIGS. 3 and 4, the service processor 255a and the I2C coprocessor 255b may be configured to each track the progress of bus transactions in a shared memory, such as a shared system memory 210 location accessed via DMA (Direct Memory Access) operations 270. Based on this tracked bus transaction information, inoperable bus states in I2C device management buses 275a-d may be detected and the device management buses 275a-d may be recovered without affecting the operation of the managed devices endpoints 220, 225, 230, 280.

In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

FIG. 3 is a swim-lane diagram describing certain functional responsibilities of components implementing a method, according to some embodiments, for detecting and recovering from an inoperable device management bus. As described with regard to FIG. 2, a remote access controller may rely on a bus protocol controller, such as the I2C coprocessor 225b, for processing and management of certain offloaded device management transactions, such as device management functions implemented using MCTP. In the embodiment of FIG. 3, an I2C coprocessor 325 manages certain I2C transactions that have been offloaded from a service processor that is a component of a remote access controller. For instance, a remote access controller may offload processing of device management messages that utilize MCTP messaging, including the I2C bus operations necessary to send and receive MCTP messages. At 330, the I2C coprocessor 325 receives device management operations offloaded from the service processor, performs necessary processing and transmits device management messages, such as MCTP messages, to the appropriate managed device bus endpoints.

The I2C coprocessor 325 may be configured to monitor the progress of each of the bus operation used to implement an offloaded device management function. As described in additional detail with regard to FIG. 4, the I2C coprocessor 325 may track bus transmissions and monitor for corresponding response to each transmission. Based on such monitoring, the I2C coprocessor 325 updates, at 335, a set of bus status counters that are maintained in a shared memory 320. Also, as described in additional detail with regard to FIG. 4, the bus status counters stored in shared memory may record various metrics for tracking the progress of bus transactions.

In certain embodiments, the shared memory 320 may be a system memory utilized by the IHS in which the remote access controller is installed. Accordingly, in such embodiments, the transactions by which the bus status counters are updated in the shared memory may be implemented as DMA (Direct Memory Access) transactions that may be completed directly by the I2C coprocessor 325, without requiring assistance from the service processor of the remote access controller, or any processor of the IHS.

As described, a service processor may be configured to offload certain types of device management operations to a bus protocol controller, such as the I2C coprocessor 325. The service processor, however, may perform certain I2C operations itself, especially for operations that provide no benefit in offloading to the I2C coprocessor. Accordingly, a service processor may utilize an IPMB (Intelligent Platform Management Bus) driver 315 for processing IPMI transactions on the I2C bus directly. Such IPMI bus transactions may be processed by the IPMB driver at 340 in support of the remote management controller communicating with the managed devices of an IHS.

Similar to the I2C coprocessor 325, the IPMB driver 315 may track the progress of each IPMB bus transaction that is conducted directly by the service processor. In particular, the IPMB driver 315 may track IPMI messages and monitor for corresponding response to each messages. However, as illustrated, the IPMB driver 315 may not have access to the shared memory 320 in order to update the bus status counters with collected metrics regarding the progress of these IPMB transactions on the I2C bus. In certain embodiments, the IPMB driver 315 may instead issue a request to the I2C driver 315, at 345, for access to the shared memory location in which the bus status counters are stored. Once the shared memory is accessed by the I2C driver 315, the tracking information generated by IPMB driver 315 is used, at 350, to update the bus status counters stored in shared memory 320. In this manner, the bus status counters may be updated, thus reflecting monitored bus transaction activity for two different messaging protocols that use an I2C sideband management bus.

As described, a device management bus may become inoperable due to a variety of errors and malfunctions by the remote access controller and by the managed devices. In many instances, the remote access controller has limited ability to control the operations of the managed devices. Accordingly, the remote access controller according to the described embodiments advantageously manages a sideband device management bus, by detecting from inoperable bus states and recovery of the sideband device management bus without intervention from the managed devices.

In order to periodically verify that the device management bus remains operable, the remote access controller may run a daemon process 305 that is configured to periodically issue a query, at block 345, requesting access to the bus status counters. The request may be received by the I2C driver 315 of the service processor which in turn reads the requested bus counter information, at 360, and provides the retrieved bus status counters, at 365, to the daemon process 305 running on the service processor. As described in additional detail with regard to FIG. 4, the daemon of the service processor may utilize the retrieved bus state counters, at 375, in order to determine whether the device management bus remains operable. If the bus status counters indicate the device management bus is inoperable, at 380, the remote access controller signals a reboot, thus reinitializing the device management bus.

FIG. 4 is a flowchart describing certain steps of a method, according to some embodiments, for using monitoring of bus transactions to detect and recover from an inoperable device management bus. As described, both the I2C coprocessor and the service processor may be configured to update a shared memory with bus status information based on monitored progress of transactions on the I2C sideband device management bus. As part of the progress tracking of transactions on the I2C bus, the I2C coprocessor and the service processor may also separately track error conditions detected on the sideband device management bus. Such error conditions may include timeout errors, busy signals and various other bus error conditions. In certain embodiments, a bus counter value is maintained in shared memory and is incremented with each successive error condition that is detected, with a separate error condition bus counter maintained for each messaging protocol.

In various embodiments, the error condition bus counter may be reset to zero based on various criteria. In certain embodiments, the error condition bus counter may be reset upon detecting any successful response on the device management bus. In other embodiments, the error condition bus counter may be reset in this manner only if the number of reported errors is below a certain threshold. As described, bus counter information may be maintained for offloaded I2C transactions, such as by an I2C coprocessor, and separately maintained for other types of I2C transactions, such as IPMI transactions conducted directly by the service processor. Accordingly, the shared memory bus counters may include separate progress tracking and error condition reporting for multiple types of I2C transactions conducted on the sideband management bus. Accordingly, in some embodiments, an error condition bus counter may be reset for one type of bus transaction protocol, only if there is no error condition reported by the bus counter and also there are no error conditions for other types of bus protocol transactions. For instance, the offloaded error condition bus counter may not be reset, in certain embodiments, if the IPMI error condition bus counter is anything other than zero. In this manner, few error conditions are required in either of the bus protocols to trigger a reset condition.

In certain embodiments, the service processor may utilize a daemon process that is configured to periodically query the bus counter information that is maintained in shared memory. At 405, the daemon process may determine whether the error condition bus counter for the offloaded I2C coprocessor transactions is below a threshold limit. If the error condition bus counter is above that limit, at 410, a reset condition of the sideband device management bus may be triggered. In scenarios where the error condition bus counter is reset in response to any successful bus transaction, the error condition bus counter is expected to remain below a specified threshold limit in scenarios with only sporadic bus errors being generated. Instead, in such embodiments, the threshold limit is only reached due to a series of consecutive bus errors being generated and reflected in the bus counters. In this manner, the tolerance for errors before signaling a reset condition may be configured through the selection of criteria for resetting the error condition bus counter in shared memory.

If the daemon process determines that the error condition bus counter is below the threshold limit, at block 415, the daemon process evaluates whether transactions offloaded to the I2C coprocessor are progressing. Similar to the tracking of error conditions by incrementing a bus counter, the I2C coprocessor may similarly increment a bus counter for each transmission initiated on the device management bus and may increment a corresponding bus counter for each responsive transmission that is received. In scenarios where the bus counters are maintained in this manner, the daemon process may access these bus counters to determine whether responsive transmissions are being received on the I2C bus. In addition, the daemon process may track bus counter values over time in order to determine whether one or all of the bus counters appears to have stalled.

If, at block 415, the daemon process determines, based on the bus counters in shared memory, that the offloaded I2C transactions are progressing, the sideband device management bus is presumed to be operable and daemon process may revert to a dormant state until the next periodic evaluation of the bus status counters at block 405. However, if the daemon process determines that the offloaded I2C transactions are not progressing, at block 420, the daemon process may signal the I2C coprocessor to initiate a status check operation, by which the sideband management bus may be reset, or other recovery procedures may be initiated by the I2C coprocessor.

As described, the service processor may maintain bus counters for non-offloaded I2C transactions, such as IPMI messaging, in the same manner as the bus counters maintained by the I2C controller. In such embodiments, the daemon process may similarly determine, at block 425, whether the error condition bus counter for the IPMI transactions is greater than a threshold limit. As with the error condition bus counters for transactions offloaded to the I2C coprocessor, the error condition bus counters for the IPMI transactions may be similarly reset according to various schemes for configuring the number of consecutive bus transaction errors that are required to trigger a reset condition of the bus controller. If the error condition bus counter for the IPMI transactions is greater than the threshold, at 410, a reset of the device management bus may be initiated.

If the error condition bus counter for the IPMI transactions is below the threshold limit, at block 430, the daemon process may determine whether the IPMI transactions are progressing. In embodiments where the service processor is processing IPMI transactions, the IPMI driver may separately monitor and track the progress of both incoming and outgoing IPMI requests in the bus counters. Accordingly, the status of the device management bus may be evaluated separately for incoming and outgoing transmissions using such directional bus counters maintained by the IPMI driver of the service processor.

With the error condition bus counter below the threshold limit, if the bus counters indicate that the IPMI transactions on the device management bus are progressing, the daemon process will revert to a dormant state. Otherwise, a reset of the device management bus may be initiated at block 410, if the incoming and/or outgoing IPMI requests are not progressing. In certain embodiments, if the IPMI bus counters indicate that bus transactions for outgoing bus requests are stalled, but incoming bus requests are progressing, the daemon process may be configured to initiate certain recovery procedures in the IPMI driver, without any action or awareness by the managed device endpoint.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for detecting and recovering from an inoperable device management bus by a remote access controller, the method comprising:
    offloading bus transactions using a first protocol to a bus controller managing device management bus operations using the first protocol;
    updating, by the bus controller, bus status counters based on a monitored status of the offloaded first protocol bus transactions;
    processing device management bus transactions using a second protocol;
    updating the bus status counters based on the status of the second protocol bus transactions;
    determining the status of the bus based on the bus status counters in shared memory; and if the bus is inoperable, resetting the remote access controller.

2. The method of claim 1, wherein the device management bus comprises an I2C bus.

3. The method of claim 2, wherein the bus protocol controller comprises an I2C co-processor of the remote access controller.

4. The method of claim 2, wherein the first protocol comprises MCTP (Management Component Transport Protocol) messaging.

5. The method of claim 4, wherein the second protocol comprises IPMB (Intelligent Platform Management Bus) bus transactions.

6. The method of claim 1, wherein the status of the device management bus is determined based on the bus status counters indicating consecutive errors in the first protocol bus transactions or the second protocol bus transaction.

7. The method of claim 6, wherein the status of the device management bus is determined based on the bus status counters indicating stalled progress in the first protocol bus transactions or the second protocol bus transaction.

8. A system for managing a device management bus coupled to a plurality of managed devices, the system comprising:
 a shared memory storing bus status counters;
 a remote access controller coupled to the plurality of managed devices via the device management bus, the remote access controller configured to:
  offload bus transactions that utilize a first protocol to a bus protocol controller;
  process device management bus transactions that utilize a second protocol;
  update the bus status counters based on a monitored status of the second protocol transactions; and
  determine the status of the device management bus based on the bus status counters in shared memory; and
 the bus protocol controller configured for managing bus operations using the second protocol, wherein the bus protocol controller comprises an I2C co-processor of the remote access controller, the bus protocol controller further configured to:
  process the offloaded transactions using the second protocol;
  update bus status counters based on the status of the offloaded second protocol transactions.

9. The system of claim 8, wherein the first protocol comprises MCTP (Management Component Transport Protocol) messaging.

10. The system of claim 8, wherein the second protocol comprises IPMB (Intelligent Platform Management Bus) bus transactions.

11. The system of claim 10, wherein the messaging protocol comprises MCTP (Management Component Transport Protocol) messaging.

12. The system of claim 8, wherein the status of the device management bus is determined based on the bus status counters indicating consecutive errors in the first protocol bus transactions or the second protocol bus transaction.

13. The system of claim 12, wherein the status of the device management bus is determined based on the bus status counters indicating stalled progress in the first protocol bus transactions or the second protocol bus transaction.

14. A remote access controller for detecting and recovering from an inoperable device management bus, wherein the remote access controller comprises one or more processors that execute instructions for remote management of a plurality of managed devices of an Information Handling System (IHS) via sideband bus connections with the managed devices, the remote access controller configured to:
 offload device management bus transactions using a first protocol to a bus protocol controller managing bus operations using the first protocol;
 update bus status counters stored in a shared memory based on the status of the offloaded first protocol transactions;
 process device management bus transactions using a second protocol;
 updating the bus status counters based on the status of the second protocol transactions;
 determine the status of the device management bus based on the bus status counters in shared memory; and
 if the device management bus is inoperable, reset the remote management access controller.

15. The remote management access controller of claim 14, wherein the bus protocol controller comprises an I2C co-processor of the remote management access controller.

16. The remote management access controller of claim 15, wherein the first protocol comprises MCTP (Management Component Transport Protocol) messaging.

17. The remote access controller of claim 16, wherein the second protocol comprises IPMB (Intelligent Platform Management Bus) bus transactions.

18. The remote access controller of claim 14, wherein the status of the device management bus is determined based on the bus status counters indicating consecutive errors in the first protocol bus transactions or the second protocol bus transaction.

19. The remote management access controller of claim 18, wherein the status of the device management bus is determined based on the bus status counters indicating stalled progress in the first protocol bus transactions or the second protocol bus transaction.

* * * * *

UNITED STATES PATENT AND TRADEMARK OFFICE
CERTIFICATE OF CORRECTION

PATENT NO. : 10,853,204 B2  
APPLICATION NO. : 16/171528  
DATED : December 1, 2020  
INVENTOR(S) : Bisa et al.

Page 1 of 1

It is certified that error appears in the above-identified patent and that said Letters Patent is hereby corrected as shown below:

In the Claims

In Column 16, Line 26, Claim 15, delete "remote management access controller" and insert -- remote access controller -- therefor.

In Column 16, Line 29, Claim 16, delete "remote management access controller" and insert -- remote access controller -- therefor.

In Column 16, Line 40, Claim 19, delete "remote management access controller" and insert -- remote access controller -- therefor.

Signed and Sealed this  
Fifth Day of January, 2021

Andrei Iancu  
*Director of the United States Patent and Trademark Office*